United States Patent
Chao et al.

(10) Patent No.: US 12,421,431 B2
(45) Date of Patent: Sep. 23, 2025

(54) STRUCTURAL ADHESIVE COMPOSITIONS

(71) Applicant: PPG Industries Ohio, Inc., Cleveland, OH (US)

(72) Inventors: Tien-Chieh Chao, Mars, PA (US); Masayuki Nakajima, Wexford, PA (US); Hongying Zhou, Allison Park, PA (US); Shanti Swarup, Allison Park, PA (US); Umesh C. Desai, Wailuku, HI (US)

(73) Assignee: PPG Industries Ohio, Inc., Cleveland, OH (US)

(*) Notice: Subject to any disclaimer, the term of this patent is extended or adjusted under 35 U.S.C. 154(b) by 0 days.

(21) Appl. No.: 18/309,236

(22) Filed: Apr. 28, 2023

(65) Prior Publication Data

US 2023/0279277 A1     Sep. 7, 2023

Related U.S. Application Data

(63) Continuation of application No. 16/507,931, filed on Jul. 10, 2019, now Pat. No. 11,674,062, which is a continuation of application No. 14/964,795, filed on Dec. 10, 2015, now Pat. No. 10,377,928.

(51) Int. Cl.
| | |
|---|---|
| *C09J 163/00* | (2006.01) |
| *C08G 59/14* | (2006.01) |
| *C08G 59/16* | (2006.01) |
| *C08G 59/40* | (2006.01) |
| *C08G 59/44* | (2006.01) |

(52) U.S. Cl.
CPC ........ *C09J 163/00* (2013.01); *C08G 59/1455* (2013.01); *C08G 59/1477* (2013.01); *C08G 59/4042* (2013.01); *C08G 59/44* (2013.01)

(58) Field of Classification Search
CPC .............. C09J 163/00; C08G 59/1455; C08G 59/1477; C08G 59/4042; C08G 59/44
USPC ........................................................ 156/330
See application file for complete search history.

(56) References Cited

U.S. PATENT DOCUMENTS

| | | | |
|---|---|---|---|
| 3,485,806 A | 12/1969 | Bloomquist et al. | |
| 3,527,802 A | 9/1970 | Slagl et al. | |
| 3,592,784 A | 7/1971 | Brack | |
| 3,628,992 A | 12/1971 | McKillip et al. | |
| 3,641,145 A | 2/1972 | Culbertson et al. | |
| 3,671,473 A | 6/1972 | Sedor et al. | |
| 3,728,387 A | 4/1973 | Freis et al. | |
| 3,756,994 A | 9/1973 | Culbertson et al. | |
| 3,781,319 A | 12/1973 | Wawzonek et al. | |
| 3,803,220 A | 4/1974 | Gasman | |
| 3,811,887 A | 5/1974 | Ishihara et al. | |
| 3,816,365 A | 6/1974 | Schmid et al. | |
| 3,860,541 A | 1/1975 | Lehmann et al. | |
| 3,888,827 A | 6/1975 | Matueda et al. | |
| 3,912,751 A | 10/1975 | Lund | |
| 3,946,131 A | 3/1976 | Biefeld et al. | |
| 3,949,140 A | 4/1976 | Biefeld et al. | |
| 3,985,807 A | 10/1976 | Grimm et al. | |
| 3,985,825 A | 10/1976 | Schmid et al. | |
| 3,993,836 A | 11/1976 | Langer et al. | |
| 4,032,593 A | 6/1977 | Samejima | |
| 4,046,658 A | 9/1977 | Brown | |
| 4,061,602 A | 12/1977 | Oberstar et al. | |
| 4,061,845 A | 12/1977 | Fabris et al. | |
| 4,091,001 A | 5/1978 | Berger | |
| 4,107,116 A | 8/1978 | Riew et al. | |
| 4,129,607 A | 12/1978 | Kooi et al. | |
| 4,304,694 A | 12/1981 | Scola et al. | |
| 4,360,649 A | 11/1982 | Kamio et al. | |
| 4,596,844 A | 6/1986 | Ohsawa et al. | |
| 4,668,736 A | 5/1987 | Robins et al. | |
| 4,851,262 A | 7/1989 | McFeaters | |
| 4,990,576 A | 2/1991 | Cuscurida et al. | |
| 4,992,089 A | 2/1991 | Cartwright et al. | |
| 5,070,119 A | 12/1991 | Nugent, Jr. et al. | |
| 5,357,008 A | 10/1994 | Tsai et al. | |
| 5,378,762 A | 1/1995 | Czomij et al. | |
| 5,426,169 A | 6/1995 | Starner | |
| 5,486,675 A | 1/1996 | Taylor et al. | |
| 5,705,585 A | 1/1998 | Hogan, Jr. | |

(Continued)

FOREIGN PATENT DOCUMENTS

| | | |
|---|---|---|
| CH | 587897 A5 | 5/1977 |
| CN | 1105355 A | 7/1995 |

(Continued)

OTHER PUBLICATIONS

Bergeron "Production of Carbon by Prolysis of Methane in Thermal Plasma", Master's Thesis is Applied Sciences, University of Sherbrooke, Faculty of Applied Sciences, Department of Chemical Enginering, Quebec, Canada, Oct. 1997.
Cassagneau et al., "Preparation of Layer-by-Layer Self-Assembly of Silver Nanoparticles Capped by Graphite Oxide Nanosheets", J. Phys. Chem. B 1999, 103, 1789-1793.
Coraux, "Growth of Graphene on Ir(111)", New Journal of Physics 11, 2009, 023006, pp. 1-22.
Dato et al., "Substrate-Free Gas-Phase Synthesis of Graphene Sheets", Nano Letters, vol. 8, No. 7, 2008, pp. 2012-2016.
Dresselhaus et al., "Science of Fullerenes and Carbon Nanotubes", Academic Press, Inc., 1996, pp. 60-79.
Du et al., "Facile Synthesis of Highly Conductive Polyaniline/Graphite Nanocomposites", European Polymer Journal 10, 2000, pp. 1489-1493.

(Continued)

*Primary Examiner* — David T Karst
(74) *Attorney, Agent, or Firm* — Ashley N. Crane; Alicia M. Passerin

(57) ABSTRACT

An adhesive composition comprising an epoxy compound and a compound comprising at least one aminimide functional group is disclosed. The compound comprising the at least one aminimide functional group is present in an amount from 2-8% by weight based on total weight of the adhesive composition and reacts with the epoxy compound upon activation by an external energy source. The adhesive composition also may comprise an amidine salt.

19 Claims, No Drawings

(56) References Cited

U.S. PATENT DOCUMENTS

| | | | |
|---|---|---|---|
| 5,734,082 A | 3/1998 | Hogan, Jr. et al. |
| 5,749,937 A | 5/1998 | Detering et al. |
| 5,788,738 A | 8/1998 | Pirzada et al. |
| 5,804,672 A | 9/1998 | Bolte et al. |
| 5,851,507 A | 12/1998 | Pirzada et al. |
| 5,935,293 A | 8/1999 | Detering et al. |
| 5,984,997 A | 11/1999 | Bickmore et al. |
| 5,989,648 A | 11/1999 | Phillips |
| 6,099,696 A | 8/2000 | Schwob et al. |
| 6,228,904 B1 | 5/2001 | Yadav et al. |
| 6,248,204 B1 | 6/2001 | Schuft |
| 6,358,375 B1 | 3/2002 | Schwob |
| RE37,853 E | 9/2002 | Detering et al. |
| 6,482,899 B2 | 11/2002 | Ohashi et al. |
| 6,506,494 B2 | 1/2003 | Brandys et al. |
| 6,645,341 B1 | 11/2003 | Gordon |
| 6,652,967 B2 | 11/2003 | Yadav et al. |
| 6,653,371 B1 | 11/2003 | Burns et al. |
| 6,669,823 B1 | 12/2003 | Sarkas et al. |
| 6,689,192 B1 | 2/2004 | Phillips et al. |
| 6,716,525 B1 | 4/2004 | Yadav et al. |
| 6,719,821 B2 | 4/2004 | Yadav et al. |
| 6,786,950 B2 | 9/2004 | Yadav et al. |
| 6,787,606 B1 | 9/2004 | Chen |
| 6,821,500 B2 | 11/2004 | Fincke et al. |
| 6,830,822 B2 | 12/2004 | Yadav et al. |
| 6,849,109 B2 | 2/2005 | Yadav et al. |
| 6,884,854 B2 | 4/2005 | Schoenfeld et al. |
| 6,884,890 B2 | 4/2005 | Kania et al. |
| 7,071,258 B1 | 7/2006 | Jang et al. |
| 7,071,263 B2 | 7/2006 | Cheng et al. |
| 7,425,604 B2 | 9/2008 | Cosman et al. |
| 7,479,534 B2 | 1/2009 | Amano et al. |
| 7,511,097 B2 | 3/2009 | Frick et al. |
| 7,547,373 B2 | 6/2009 | Hachikian |
| 7,596,844 B2 | 10/2009 | Japuntich et al. |
| 7,635,458 B1 | 12/2009 | Hung et al. |
| 7,754,184 B2 | 7/2010 | Mercuri |
| 7,776,303 B2 | 8/2010 | Hung et al. |
| 7,785,492 B1 | 8/2010 | Jang et al. |
| 7,790,285 B2 | 9/2010 | Zhamu et al. |
| 7,824,741 B2 | 11/2010 | Sandhu |
| 7,829,317 B2 | 11/2010 | Ofstead et al. |
| 7,842,271 B2 | 11/2010 | Petrik |
| 7,847,034 B2 | 12/2010 | Burns et al. |
| 8,047,248 B2 | 11/2011 | Prud'homme et al. |
| 8,222,324 B2 | 7/2012 | Yamaguchi et al. |
| 8,430,989 B2 | 4/2013 | Burchkhardt et al. |
| 8,466,238 B2 | 6/2013 | Tamatani et al. |
| 8,471,065 B2 | 6/2013 | Burton et al. |
| 8,486,363 B2 | 7/2013 | Hung et al. |
| 8,673,108 B2 | 3/2014 | Liang et al. |
| 8,796,361 B2 | 8/2014 | Assay et al. |
| 8,968,695 B2 | 3/2015 | Kwon et al. |
| 9,546,092 B2 | 1/2017 | Aksay et al. |
| 2004/0072927 A1 | 4/2004 | Hachikian |
| 2004/0176550 A1 | 9/2004 | McQuaid |
| 2005/0222300 A1* | 10/2005 | Ikezawa ............... H01L 23/296 |
| | | 257/E23.12 |
| 2005/0271574 A1 | 12/2005 | Jang et al. |
| 2006/0093885 A1 | 5/2006 | Krusic et al. |
| 2006/0121279 A1 | 6/2006 | Petrik |
| 2006/0216222 A1 | 9/2006 | Jang |
| 2006/0252891 A1 | 11/2006 | McQuaid |
| 2007/0021582 A1 | 1/2007 | Amano et al. |
| 2007/0045116 A1 | 3/2007 | Hung et al. |
| 2007/0065703 A1 | 3/2007 | Abd Elhamid et al. |
| 2007/0191556 A1 | 8/2007 | Eger |
| 2008/0103340 A1 | 5/2008 | Binder et al. |
| 2008/0206124 A1 | 8/2008 | Jang et al. |
| 2008/0220282 A1 | 9/2008 | Jang et al. |
| 2008/0251202 A1 | 10/2008 | Eagle et al. |
| 2009/0022649 A1 | 1/2009 | Zhamu et al. |
| 2009/0048370 A1 | 2/2009 | Lutz et al. |
| 2009/0068395 A1* | 3/2009 | Kousaka ............... C08J 5/249 |
| | | 428/116 |
| 2009/0068471 A1 | 3/2009 | Choi et al. |
| 2009/0075035 A1 | 3/2009 | O'Brien et al. |
| 2009/0110627 A1 | 4/2009 | Choi et al. |
| 2009/0169467 A1 | 7/2009 | Zhamu et al. |
| 2009/0294057 A1 | 12/2009 | Liang et al. |
| 2009/0308534 A1 | 12/2009 | Malone |
| 2010/0036023 A1 | 2/2010 | Weng et al. |
| 2010/0047154 A1 | 2/2010 | Lee et al. |
| 2010/0055017 A1 | 3/2010 | Vanier et al. |
| 2010/0055025 A1 | 3/2010 | Jang et al. |
| 2010/0072430 A1 | 3/2010 | Gergely et al. |
| 2010/0096597 A1 | 4/2010 | Prud'homme et al. |
| 2010/0104832 A1 | 4/2010 | Messe et al. |
| 2010/0105834 A1 | 4/2010 | Tour et al. |
| 2010/0126660 A1 | 5/2010 | O'Hara |
| 2010/0130655 A1 | 5/2010 | Agarwal et al. |
| 2010/0247801 A1 | 9/2010 | Zenasni |
| 2010/0255219 A1 | 10/2010 | Wenxu et al. |
| 2010/0280191 A1 | 11/2010 | Dixit et al. |
| 2010/0301212 A1 | 12/2010 | Dato et al. |
| 2010/0303706 A1 | 12/2010 | Wallace et al. |
| 2010/0304291 A1 | 12/2010 | Ebara |
| 2010/0314788 A1 | 12/2010 | Hung et al. |
| 2010/0323113 A1 | 12/2010 | Ramappa et al. |
| 2011/0017955 A1 | 1/2011 | Zhamu et al. |
| 2011/0046289 A1 | 2/2011 | Zhamu et al. |
| 2011/0070426 A1 | 3/2011 | Vanier et al. |
| 2011/0076391 A1 | 3/2011 | Gross et al. |
| 2012/0095133 A1 | 4/2012 | Vyakaranam et al. |
| 2012/0114551 A1 | 5/2012 | Coleman |
| 2012/0128499 A1 | 5/2012 | Desai et al. |
| 2012/0129980 A1 | 5/2012 | Desai et al. |
| 2012/0211160 A1 | 8/2012 | Asay et al. |
| 2012/0237749 A1 | 9/2012 | Aksay et al. |
| 2012/0256138 A1 | 10/2012 | Suh et al. |
| 2013/0084236 A1 | 4/2013 | Hung et al. |
| 2013/0084237 A1 | 4/2013 | Vanier et al. |
| 2013/0115442 A1 | 5/2013 | Sang |
| 2013/0256863 A1* | 10/2013 | Ito .................... H01L 23/293 |
| | | 257/676 |
| 2014/0150970 A1 | 6/2014 | Desai et al. |

FOREIGN PATENT DOCUMENTS

| | | |
|---|---|---|
| CN | 101550325 A | 10/2009 |
| CN | 102199239 A | 9/2011 |
| DE | 239336 A1 | 9/1986 |
| EP | 0364958 A2 | 10/1989 |
| EP | 2199313 A1 | 6/2010 |
| EP | 2518103 A2 | 1/2012 |
| GB | 1373144 | 11/1974 |
| GB | 1505571 A | 3/1978 |
| JP | S5054700 A | 5/1975 |
| JP | S5173031 A | 6/1976 |
| JP | S52138931 A | 11/1977 |
| JP | S534542 A | 1/1978 |
| JP | S53137143 A | 11/1978 |
| JP | S54139641 A | 10/1979 |
| JP | S56159642 A | 12/1981 |
| JP | 59068990 A | 4/1984 |
| JP | S6123662 A | 2/1986 |
| JP | S6248720 A | 3/1987 |
| JP | S6440551 A | 2/1989 |
| JP | S6440552 A | 2/1989 |
| JP | 01-170614 A | 7/1989 |
| JP | 01-172418 A | 7/1989 |
| JP | H01235943 A | 9/1989 |
| JP | H04369254 A | 12/1992 |
| JP | H0525354 A | 2/1993 |
| JP | 05-173031 A | 7/1993 |
| JP | H06222559 A | 8/1994 |
| JP | H06239959 A | 8/1994 |
| JP | H06301205 A | 10/1994 |
| JP | H07233233 A | 9/1995 |
| JP | H08269115 A | 10/1996 |
| JP | H09235354 A | 9/1997 |
| JP | H10139748 A | 5/1998 |

(56) References Cited

FOREIGN PATENT DOCUMENTS

| JP | H111635 A | 1/1999 |
|---|---|---|
| JP | H11124771 A | 5/1999 |
| JP | H11254829 A | 9/1999 |
| JP | 2000086743 A | 3/2000 |
| JP | 2000169556 A | 6/2000 |
| JP | 2000336252 A | 12/2000 |
| JP | 2003026772 A | 1/2003 |
| JP | 2003026982 A | 1/2003 |
| JP | 2003096061 A | 4/2003 |
| JP | 20060008730 A | 1/2006 |
| JP | 2012-057007 A | 3/2012 |
| JP | 2012188593 A | 10/2012 |
| KR | 20040061909 A | 12/2002 |
| RU | 2346090 A | 5/2008 |
| RU | 2365608 C2 | 4/2009 |
| RU | 2496915 A | 9/2013 |
| SU | 176393 A1 | 12/1965 |
| WO | 7900448 A1 | 7/1979 |
| WO | 9401102 A1 | 1/1994 |
| WO | 9518186 A1 | 7/1995 |
| WO | 9801495 A1 | 1/1998 |
| WO | 9962335 A1 | 12/1999 |
| WO | 201005905 A1 | 5/2010 |
| WO | 2012006001 A2 | 1/2012 |
| WO | 2012/066001 A1 | 5/2012 |
| WO | 2013086277 A2 | 6/2013 |
| WO | 2015073959 A1 | 5/2015 |

OTHER PUBLICATIONS

Fincke et al., "Plasma Pyrolysis of Methane to Hydrogen and Carbon Black", Industrial and Engineering Chemistry Research, vol. 41, No. 6, 2002, pp. 1425-1435.
Fitzer et al., "Recommended Terminology for the Description of Carbon as a Solid", International Union of Pure and Applied Chemistry, Inorganic Chemistry Division, Pure & Applied Chemistry, vol. 67, No. 3, 1995, pp. 473-506.
Gannon, "Acetylene from Hydrocarbons", Kirk-Othmer Encyclopedia of Chemical Technology, 2003, pp. 1-28.
Gomez De Arco et al., "Synthesis, Transfer, and Devices of Single- and Few-Layer Graphene by Chemical Vapor Deposition", IEEE Transactions on Nanotechnology, vol. 8, No. 2, Mar. 2009, pp. 135-138.
Gonzalez-Aguilar et al., "Carbon Nanstructures Production by Gas-Phase Plasma Processes at Atmospheric Pressure", J. Phys. D, Appl. Phys., vol. 40, No. 8, 2007, pp. 2361-2374.
Holmen et al., "High-Temperature Pyrolysis of Hydrocarbons. 1. Methane to Acetylene", The Norwegian Institute of Technology, University of Trondheim, Ind. Eng. Chem., Process Des. Dev., vol. 15, No. 3, 1976.
Khan et al., "Survey of Recent Methane Pyrolysis Literature", Industrial and Engineering Chemistry, vol. 62, No. 10, Oct. 1970.
Kim et al., "Fabrication of Graphene Flakes Composed of Multi-Layer Graphene Sheets using a Thermal Plasma Jet System", Nanotechnology 21, Jan. 29, 2010.
Kim et al., "Continuous Synthesis of Nanostructured Sheetlike Carbons by Thermal Plasma Decomposition of Methane", IEEE Transactions on Plasma Science, vol. 35, No. 2, Apr. 2007.
Kostic et al., "Thermodynamic Consideration of B—O—C—H System for Boron Carbide {B4C} Powder Synthesis in Thermal Plasma", Progress in Plasma Processing of Materials, 1997, pp. 889-898.
Lavoie, "Synthesis of Carbon Black from Propane Using a Thermal Plasma", Master's Thesis in Applied Sciences, University of Sherbrooke, Faculty of Applied Sciences, Department of Chemical Engineering, Quebec, Canada, Sep. 1997.

Malesevic et al., "Synthesis of Few-Layer Graphene via Microwave Plasma-Enhanced Chemical Vapour Deposition", Nanotechnology 2008, vol. 19, No. 30, 305604 (6 pps).
McWilliams, "Graphene: Technologies, Applications, and Markets", BCC Research Report , Feb. 2011.
Nandamuri et al., "Chemical Vapor Deposition of Graphene Films", Nanotechnology 21, 2010, 145604 (4 pp.).
Pham et al., "Epoxy Resins", Encyclopedia of Polymer Science and Technology, Jan. 2004, vol. 9, pp. 678-804.
Pristavita et al., "Carbon Blacks Produced by Thermal Plasma: the Influence of the Reactor Geometry on the Product Morphology", Plasma Chem. Plasma Process, 30, 2010, pp. 267-279.
Pristavita et al., "Carbon Nano-Flakes Produced by an Inductively Coupled Thermal Plasma System for Catalyst Applications", Plasma Chem. Plasma Process, 31, 2011, pp. 393-403.
Pristavita et al., "Carbon Nanoparticle Production by Inductively Coupled Thermal Plasmas: Controlling the Thermal History of Particle Nucleation", Plasma Chem. Plasma Process, 31, 2011, pp. 851-S66.
Rafiee et al., "Enhanced Mechanical Properties of Nanocomposites at Low Graphene Content", ACSNANO, vol. 3, No. 12, 2009.
Ratna et al., "Shock-Resistance Ambient Temperature Curing Epoxy Adhesive", J. Adhesion Sci. Technol., 2003, vol. 17, No. 5, pp. 623-632.
Skinner, "Prolysis of Methane and the C2 Hydrocarbons", Monsanto Chemical Co., Research and Engineering Division, Dayton 7, Ohio, pp. 59-68., 1959.
Song et al., "Properties of Styrene-Butadiene Rubber Nanocomposites Reinforced with Carbon Black, Carbon Nanotube, Graphene, Graphite", Kor. J. Mater. Res. 2010 vol. 20, No. 2, pp. 104-110.
Subrahmanyam et al., "Simple Method of Preparing Graphene Flakes by an Arc-Discharge Method", The Journal o Physical Chemistry C, vol. 113, No. 11, 2009, pp. 4257-4259.
Tang et al., Processible Nanostructured Materials with Electrical Conductivity and Magnetic Susceptibility: Preparation and Properties of Maghemite/Polyaniline Nanocomposite Films, Chem. Mater., 1999, 11, 1581-1589.
Zhong et al., "Catalytic Growth of Carbon Nanoballs With and Without Cobalt Encapsulation", Cemical Physics etters 330, 2000, pp. 41-47.
www.strem.com/uploads/resources/documents/graphene_nanoplatelets, pdf, Apr. 2013.
Skinner, "Pyrolysis of Methane and The C2 Hydrocarbons", Monsanto Chemical Co., Research and Engineering Division, Dayton 7, Ohio, 1959, pp. 59-68.
Des Elms et al., "Aminimide thermolytic color coupler generating compounds", Research Disclosure No. 159037, Jul. 1977, Questel Ireland Lid., (8 pp.).
Des Elms et al., "Base generating aminimides for photographic materials", Research Disclosure No. 157076, May 1977, Questel Ireland Lid., (6 pp.).
Frank et al., "Gravure patterns designed to enhance lateral registration", Research Disclosure No. 157038, May 1977, Questel Ireland Lid., (2 pp.).
Wilson, "Polymeric aminimide antistate", Research Disclosure No. 159014, Jul. 1977, Questel Ireland Lid., (4 pp.).
Bobylev, "Epoxy Hardeners", Kompozitny Mir, No. 4, 2006 (7), pp. 20-24.
McKillip et al., "The Chemistry of Aminimides", Chemical Reviews, 1973, vol. 73, No. 3, pp. 255-281.
D1—Ding Lipeng, "Characteristics and curing mechanism of aminimide-cured epoxy resin system", «Thermoset Resin», No. 4, pp. 22-25, published Apr. 30, 1996. Chinese and English versions.
D2—Li Zhengli et al, "Research progress in the synthesis of aminoimide compounds by UDMH", «Energetic Materials», vol. 16, No. 4, pp. 469-473, published Aug. 15, 2008. Chinese and English versions.

* cited by examiner

STRUCTURAL ADHESIVE COMPOSITIONS

CROSS-REFERENCE TO RELATED APPLICATION

This application is a continuation of U.S. patent application Ser. No. 16/507,931, filed Jul. 10, 2019, which is a continuation of U.S. patent application Ser. No. 14/964,795, filed Dec. 10, 2015, now U.S. Pat. No. 10,377,928, granted Aug. 13, 2019, each of which is incorporated herein by reference.

FIELD

The present invention relates to structural adhesive compositions, and more particularly to one-component compositions.

BACKGROUND

Structural adhesives are utilized in a wide variety of applications to bond together two or more substrate materials. For example, structural adhesives may be used for binding together automotive or industrial components.

The present invention is directed towards adhesive compositions that provide sufficient bond strength and are easy to apply for use in bonding together substrate materials.

SUMMARY

The present invention also is an adhesive composition comprising an epoxy compound and a polymeric compound comprising at least two aminimide functional groups, wherein the polymeric compound reacts with the epoxy compound upon activation by an external energy source; wherein the polymeric compound is present in an amount from 2-8% by weight based on total weight of the adhesive composition.

The present invention also is an adhesive composition comprising an epoxy compound and a monomeric compound comprising at least one aminimide functional group, wherein the monomeric compound reacts with the epoxy compound upon activation by an external energy source; wherein the monomeric compound is present in an amount from 2-8% by weight based on total weight of the adhesive composition.

The present invention also is an adhesive composition comprising an epoxy compound; an aminimide-containing compound present in an amount of from 2% to 8% by weight based on total weight of the adhesive composition; and a reaction product of reactants comprising an amidine and a second component, wherein the epoxy, the aminimide-containing compound, and the reaction product react upon activation by an external energy source.

Also disclosed are adhesives formed from the adhesive compositions and methods of forming a bonded substrate using the adhesive compositions disclosed herein.

DETAILED DESCRIPTION

For purposes of the following detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "a" hydrazine comprising a trivalent nitrogen, "an" anhydride functional material, and "a" cyclic ester, a combination (a plurality) of these components can be used in the present invention.

In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, or provided on but not necessarily in contact with the surface. For example, an adhesive composition "applied onto" a substrate does not preclude the presence of one or more other intervening coating layers of the same or different composition located between the adhesive composition and the substrate.

As used herein, the term "structural adhesive" means an adhesive producing a load-bearing joint having a lap shear strength of greater than 5 MPa, as determined by using an Instron 5567 machine in tensile mode with a pull rate of 10 mm per minute.

As used herein, "alkyl" refers to an optionally substituted hydrocarbon chain that may be linear or branched.

As used herein, "aromatic" refers to a hydrocarbon having a delocalized conjugated $\pi$-system with alternating double and single bonds between carbon atoms forming one or more coplanar hydrocarbon rings.

As used herein, "cycloaliphatic" refers to a hydrocarbon that comprises one or more hydrocarbon rings that are not aromatic.

As used herein, the term "trivalent nitrogen" refers to a nitrogen atom bound to one further nitrogen atom and two carbon atoms.

As defined herein, a "1K" or "one-component" adhesive composition, is a composition in which all of the ingredients may be premixed and stored and wherein the reactive components do not readily react at ambient or slightly thermal conditions, but instead only react upon activation by an external energy source. In the absence of activation from the external energy source, the composition will remain largely unreacted (having less than a 100% increase in viscosity when stored at 25° C. for 90 days, where viscosity is measured with an Anton Paar Physica MCR 301 rheometer with 25 mm parallel plate and 1 mm gap at the following shear conditions: Conditioning: Rotation with shear rate at 0.1 s$^{-1}$ for 60 seconds; Tempering: No shear for 240 seconds; Amplitude test: Oscillation with log increasing strain γ from 0.01 to 10% in 90 seconds (data measured every 3 seconds); Shear phase: Oscillation with 10% strain (γ) at 10 Hz for 120 seconds (data measured every 10 seconds); Re-conditioning: Rotation with shear rate at 0.1 s$^{-1}$ for 60 seconds; Regenerated mode: Oscillation with 0.05% strain (γ) for 120 seconds (data measured every 10 seconds)). External energy sources that may be used to promote the curing reaction include, for example, radiation (i.e., actinic radiation such as ultraviolet light) and/or heat. As further defined herein, ambient conditions generally refer to room temperature and humidity conditions or temperature and humidity conditions that are typically found in the area in which the adhesive is being applied to a substrate, e.g., at 20° C. to 40° C. and 20% to 80% relative humidity, while slightly thermal conditions are temperatures that are slightly above ambient temperature but are generally below the curing temperature for the adhesive composition (i.e., in other words, at temperatures and humidity conditions below which the reactive components will readily react and cure, e.g., >40° C. and less than 100° C. at 20% to 80% relative humidity).

As used herein "monomer" refers generally to a component that can be polymerized with another polymerizable component such as another monomer or a polymer to form a compound that comprises residues of the monomeric or polymeric components, respectively.

As used herein "polymer" refers generally to prepolymers, oligomers, homopolymers, copolymers, or combinations thereof.

As used herein, the term "aminimide" refers to a molecule, i.e. a monomer or polymer, that comprises at least one aminimide functional group. As used herein, an "aminimide functional group" comprises an anionic nitrogen bonded to a cationic nitrogen and a carbonyl group according to the following formula:

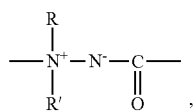

wherein R and R' may be the same or different and may be an alkyl group or an aryl group. For clarity, an aminimide may comprise functional groups in addition to the aminimide functional group(s).

As used herein, the term "carbonyl group" refers to a functional group comprising a carbon atom double-bonded to an oxygen atom, which is common to several classes of compounds including, but not being limited to as aldehydes, ketones, carboxylic acids, acid anhydrides, esters, etc.

As used herein, "monofunctional," when used with respect to the number of aminimide functional groups a particular monomer or polymer comprises, means a monomer or polymer comprising more than zero (0) aminimide functional groups but fewer than two (2) aminimide functional groups, such as, for example, one aminimide group per molecule.

As used herein, "bifunctional," when used with respect to the number of aminimide functional groups a particular monomer or polymer comprises, means a monomer or polymer comprising two (2) aminimide functional groups per molecule.

As used herein, "polyfunctional," when used with respect to the number of aminimide functional groups a particular monomer or polymer comprises, means a monomer or polymer comprising more than two (2) aminimide functional groups per molecule.

As used herein, "aminimide" containing compounds refer to compounds that act as catalysts for epoxy resins.

As used herein, the term "catalyst" means a substance that increases the rate of a chemical reaction without itself undergoing any permanent chemical change.

As used herein, the term "molecular weight" means the theoretical number average molecular weight ($M_n$).

As used herein, unless indicated otherwise, the term "substantially free" means that a particular material is not purposefully added to a composition and is only present as an impurity in a trace amount of less than 1% by weight based on a total weight of the composition. As used herein, unless indicated otherwise, the term "completely free" means that a composition does not comprise a particular material, i.e., the composition comprises 0% by weight of such material.

As stated above, disclosed herein is an adhesive composition. The adhesive composition of the present invention may comprise an epoxy compound and a compound comprising at least one aminimide functional group, wherein the compound comprising the at least one aminimide functional group reacts with the epoxy compound upon activation by an external energy source, and wherein the compound is present in an amount from 2-8% by weight based on total weight of the adhesive composition.

The adhesive composition may comprise an epoxy compound. Suitable epoxy compounds that may be used include monoepoxides, polyepoxides, or combinations thereof.

Suitable monoepoxides that may be used include monoglycidyl ethers of alcohols and phenols, such as phenyl glycidyl ether, n-butyl glycidyl ether, cresyl glycidyl ether, isopropyl glycidyl ether, glycidyl versatate, for example, CARDURA E available from Shell Chemical Co., and glycidyl esters of monocarboxylic acids such as glycidyl neodecanoate, and mixtures of any of the foregoing.

Suitable polyepoxides include polyglycidyl ethers of Bisphenol A, such as Epon® 828 and 1001 epoxy resins, and Bisphenol F diepoxides, such as Epon® 862, which are commercially available from Hexion Specialty Chemicals, Inc. Other useful polyepoxides include polyglycidyl ethers of polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, and combinations thereof.

In addition to the polyepoxides described above, additional polymers containing pendant epoxy groups also may be used to form the adhesive composition of the present invention. These polymers may be made by copolymerizing a variety of polymerizable ethylenically unsaturated monomers at least one of which is an epoxy containing monomer, e.g., glycidyl (meth)acrylate or allyl glycidyl ether. An example of such an additional polymer includes but is not limited to Epon® 1007.

Other useful epoxides that may be used to form the adhesive composition of the present invention include polyepoxides and are disclosed, for example, in U.S. Publication No. US 2014/0150970 at paragraphs [0023] to [0027], incorporated by reference herein.

Useful polyols that may be used to form an epoxy-functional resin for use in the adhesive composition include diols, tetraols and higher functional polyols. The polyols can be based on a polyether chain derived from ethylene glycol, propylene glycol, butylenes glycol, hexylene glycol and the like and mixtures thereof. The polyol can also be based on a polyester chain derived from ring opening polymerization of caprolactone. Suitable polyols may also include polyether polyol, polyurethane polyol, polyurea polyol, acrylic polyol, polyester polyol, polybutadiene polyol, hydrogenated polybutadiene polyol, polycarbonate polyols, polysiloxane polyol, and combinations thereof. Polyamines corresponding to polyols can also be used, and in this case, amides instead of carboxylic esters will be formed with acids and anhydrides.

Suitable diols that may be utilized to form the epoxy-functional resin for use in the adhesive composition are diols having a hydroxyl equivalent weight of between 30 and 1000. Exemplary diols having a hydroxyl equivalent weight from 30 to 1000 include diols sold under the trade name Terathane®, including Terathane® 250, available from Invista. Other exemplary diols having a hydroxyl equivalent weight from 30 to 1000 include ethylene glycol and its polyether diols, propylene glycol and its polyether diols, butylenes glycol and its polyether diols, hexylene glycols and its polyether diols, polyester diols synthesized by ring opening polymerization of caprolactone, and urethane diols synthesized by reaction of cyclic carbonates with diamines. Combination of these diols and polyether diols derived from combination various diols described above could also be used. Dimer diols may also be used including those sold under trade names Pripol® and Solvermol™ available from Cognis Corporation.

Polytetrahydrofuran-based polyols sold under the trade name Terathane®, including Terathane® 650, available from Invista, may be used. In addition, polyols based on dimer diols sold under the trade names Pripol® and Empol®, available from Cognis Corporation, or bio-based polyols, such as the tetrafunctional polyol Agrol 4.0, available from BioBased Technologies, may also be utilized.

Useful anhydride compounds to functionalize the polyol with acid groups include hexahydrophthalic anhydride and its derivatives (e.g. methyl hexahydrophthalic anhydride); phthalic anhydride and its derivatives (e.g. methyl phthalic anhydride); maleic anhydride; succinic anhydride; trimelletic anhydride; pyromelletic dianhydride (PMDA); 3,3',4,4'-oxydiphthalic dianhydride (ODPA); 3,3',4,4'-benzopherone tetracarboxylic dianhydride (BTDA); and 4,4'-diphthalic(hexamfluoroisopropylidene)anhydride (6FDA). Useful diacid compounds to functionalize the polyol with acid groups include phthalic acid and its derivatives (e.g. methyl phthalic acid), hexahydrophthalic acid and its derivatives (e.g. methyl hexahydrophthalic acid), maleic acid, succinic acid, adipic acid, etc. Any diacid and anhydride can be used.

According to the present invention, the epoxy compound may be present in the adhesive composition in an amount of at least 50% by weight based on total composition weight, such as at least 60% by weight, such as at least 70% by weight, and in some cases may be no more than 95% by weight based on total composition weight, such as no more than 90% by weight, such as no more than 85% by weight. According to the present invention, the epoxy compound may be present in the adhesive composition in an amount from 50% to 95% by weight based on the total composition weight, such as from 60% to 90%, such as from 70% to 87%.

The molecular weight of the epoxy compound may be at least 44, such as at least 58, and in some cases may be no more than 5000, such as no more than 3000, such as no more than 1000. According to the present invention, the molecular weight of the epoxy compound may be from 44 to 5000, such as from 58 to 3000, such as from 58 to 1000.

The epoxy compound may have an epoxy equivalent weight (EEW) of at least 44, such as at least 58, and in some cases may be no more than 2500, such as no more than 1500, such as no more than 500. According to the present invention, the epoxy compound may have an EEW of from 44 to 2500, such as from 58 to 1500, such as from 58 to 500. As used herein, EEW refers to the molecular weight of the epoxide compound divided by the number of epoxy groups per molecule.

The adhesive composition also may comprise a compound containing at least one aminimide functional group, i.e., the compound may be a monofunctional aminimide, a difunctional aminimide, or a polyfunctional aminimide. Suitable compounds containing at least one aminimide functional group include monomeric or polymeric compounds. Useful monomeric aminimide-containing compounds may comprise a reaction product of reactants comprising a monofunctional epoxy and hydrazine with ester functionality. Useful polymeric aminimide-containing compounds may comprise a reaction product of reactants comprising a polymeric epoxy or a polymeric ester with hydrazine. Optionally, the polymeric compound may be a reaction product of an epoxy compound, a hydrazine and an anhydride functional material.

Optionally, the polymeric compound may be a reaction product of an epoxy compound, a hydrazine, and a cyclic compound containing a carbonyl group and at least one heteroatom alpha to the carbonyl group at a temperature greater than 20° C. to form the aminimide-containing material, wherein at least one of the epoxy compound and the cyclic compound is polymeric.

Useful aminimides that may be used in the adhesive composition of the present invention are disclosed in U.S. patent application Ser. No. 14/964,748, paragraphs [0043] to [0056], incorporated herein by reference. For example, useful aminimides include an aminimide represented by one of the formulae I-, II, or a combination thereof:

(formula I)
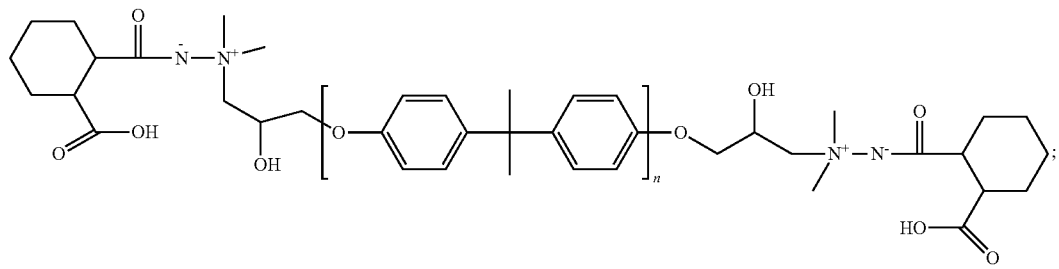
(formula II)
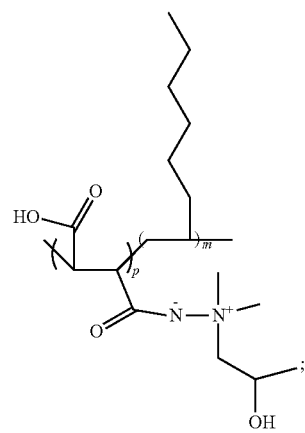
(formula III)
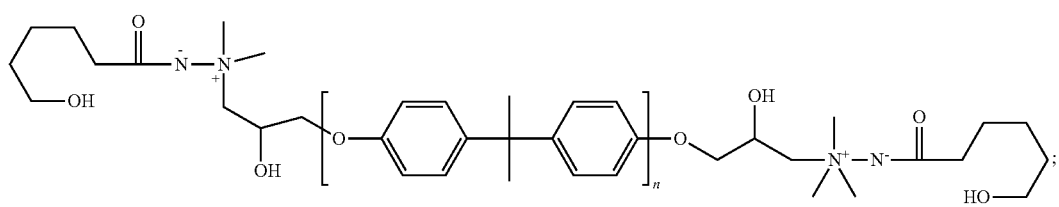
(formula IV)
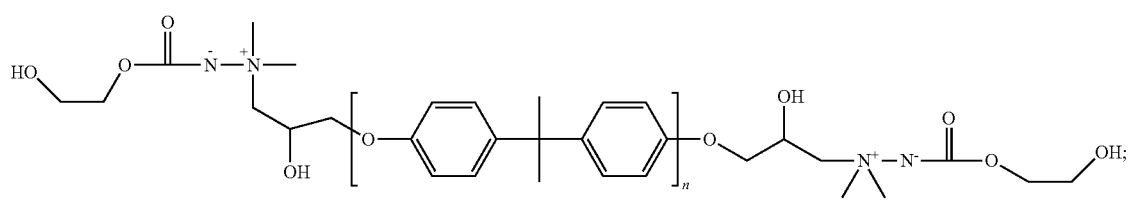
(formula V)
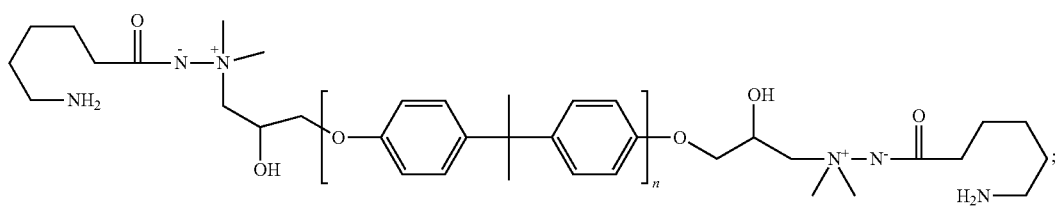
(formula VI)
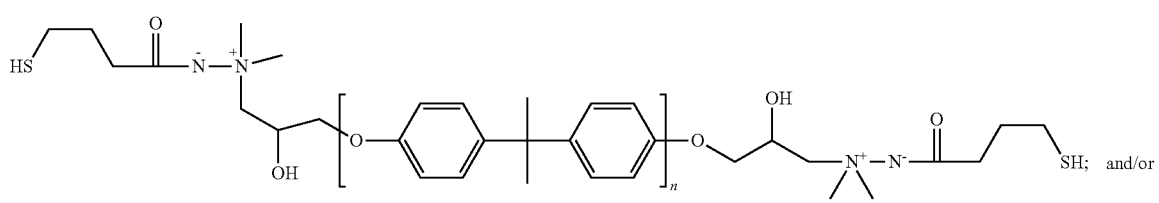
and/or -continued
(formula VII)
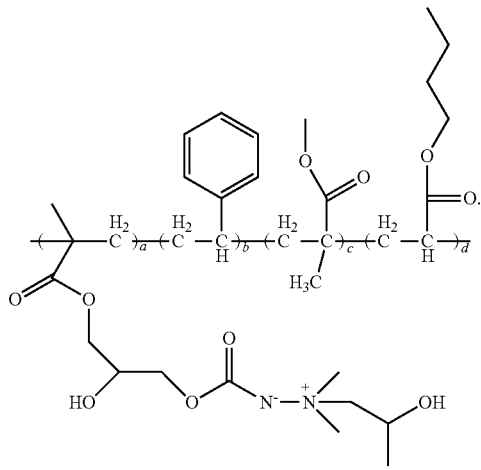
In examples, the aminimide may be formed by reacting an epoxy compound, a hydrazine compound comprising a trivalent nitrogen, and an anhydride function material according to at least one of the following reactions:
(Reaction I)
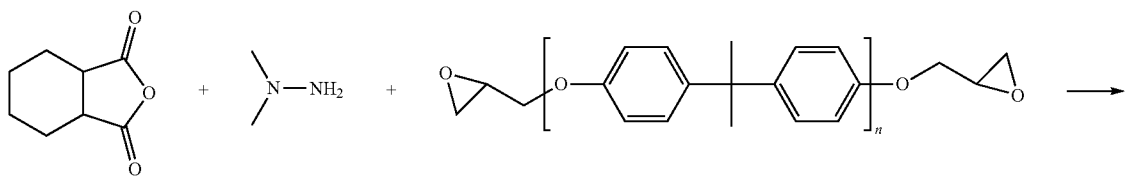
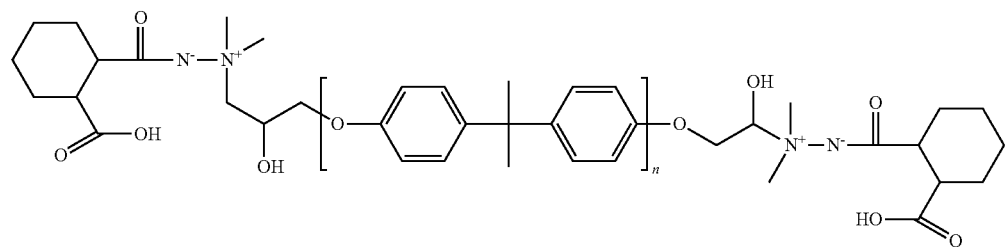

wherein n≥3; and/or (Reaction II)

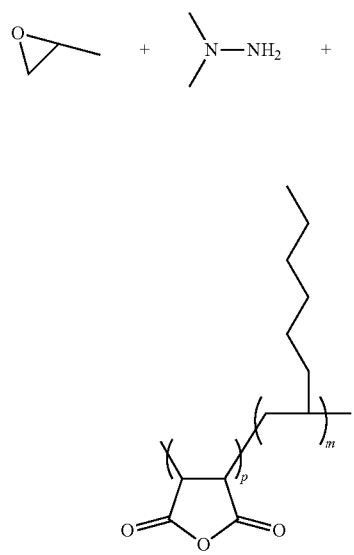

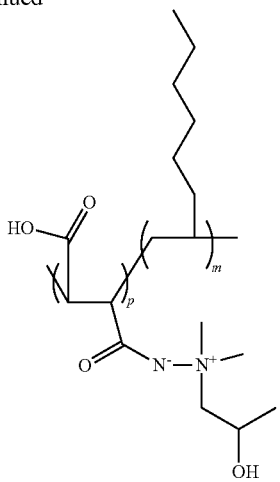

wherein p≥2.4 and m≥4.3.

According to the present invention, the aminimide may be formed by reacting an epoxy compound, a hydrazine compound comprising a trivalent nitrogen, and a cyclic compound containing a carbonyl group and at least one heteroatom alpha to the carbonyl group according to at least one of the following reactions:

(Reaction III)

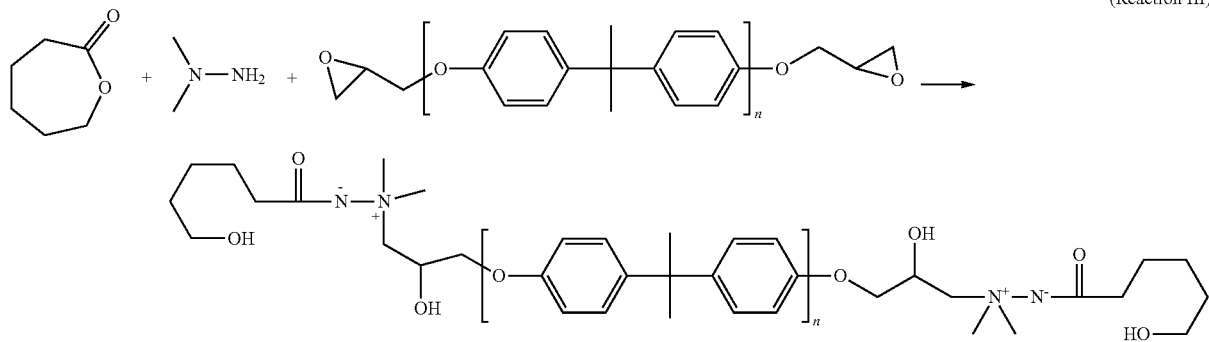

(Reaction IV)

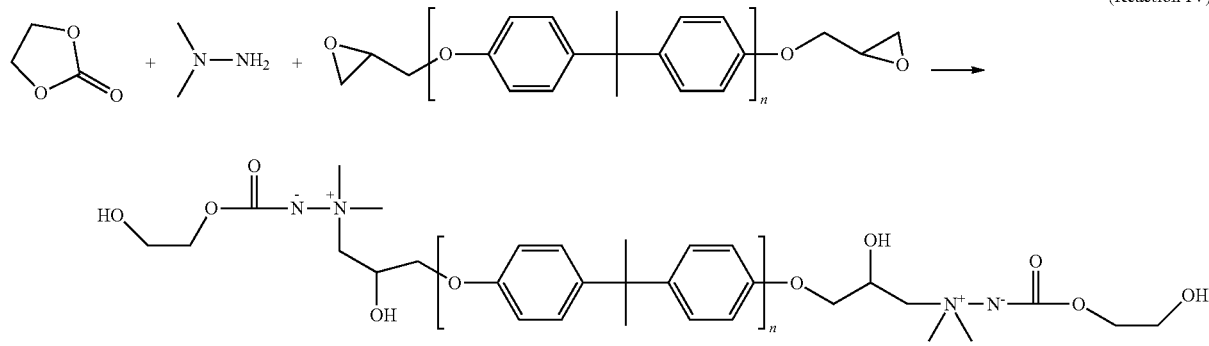

(Reaction V)

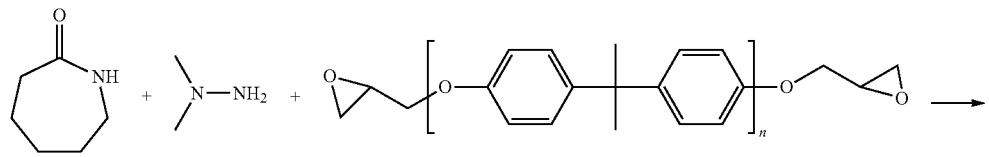

-continued

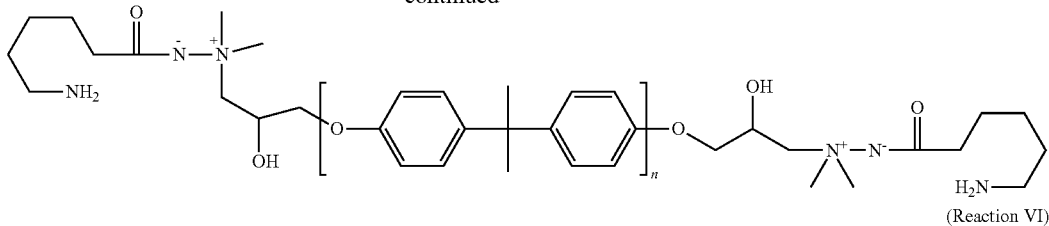

(Reaction VI)

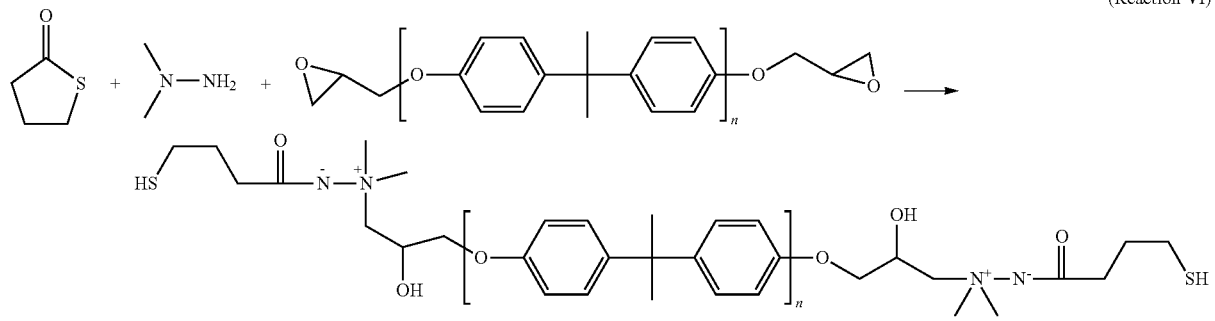

wherein n≥3; and/or (Reaction VII)

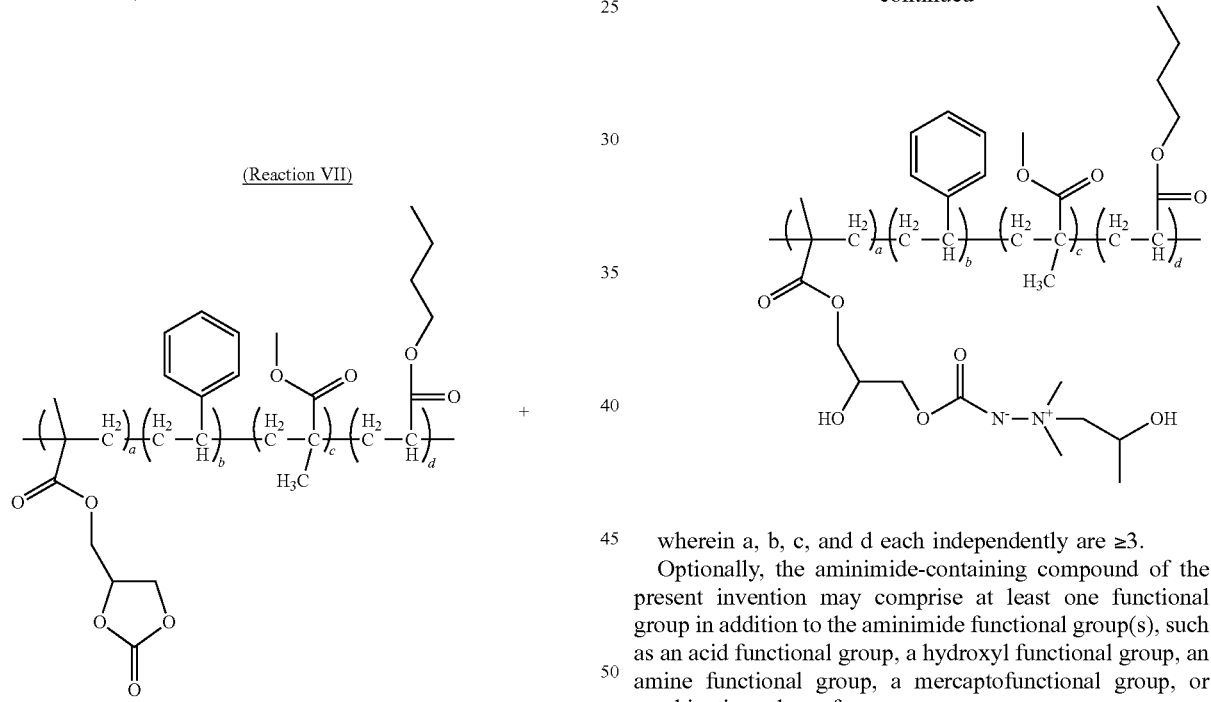

-continued

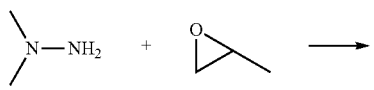

wherein a, b, c, and d each independently are ≥3.

Optionally, the aminimide-containing compound of the present invention may comprise at least one functional group in addition to the aminimide functional group(s), such as an acid functional group, a hydroxyl functional group, an amine functional group, a mercaptofunctional group, or combinations thereof.

According to the present invention, the aminimide-containing compound may be present in the adhesive composition in an amount of at least 2% by weight based on total weight of the adhesive composition, such as at least 2.5% by weight, such as at least 3% by weight, and in some cases may be present in an amount of no more than 8% by weight based on total weight of the adhesive composition, such as no more than 7.5%, such as no more than 7% by weight. According to the present invention, the aminimide-containing compound may be present in the adhesive composition in an amount of from 2% to 8% by weight based on total weight of the adhesive composition, such as from 2.5% to 7.5%, such as from 3% to 7%.

According to the present invention, the aminimide-containing compound may chemically react with the epoxy compound upon activation by an external energy source, such as for example, radiation and/or heat. Optionally, for example, the aminimide-containing compound may chemically react with the epoxy compound upon exposure to a temperature of at least 100° C., such as at least 110° C., such as at least 120° C., such as at least 130° C., and in some cases may be exposed to a temperature of no more than 200° C., such as no more than 190° C., such as no more than 180° C., such as no more than 170° C. According to the present invention, the aminimide-containing compound may chemically react with the epoxy compound upon exposure to a temperature of from 100° C. to 200° C., such as from 110° C. to 190° C., such as from 120° C. to 180° C., such as from 130° C. to 170° C.

Optionally, in the present invention, the adhesive composition may further comprise a reaction product of reactants comprising an amidine and a second component. Useful amidines include, but are not limited to 1,8-diazabicyclo [5.4.0]undec-7-ene; 1,5-diazabicyclo[4.3.0]non-5-ene; 1,5,7-triazabicyclo[4.4.0]dec-5-ene; or combinations thereof. Useful second components include but are not limited to a phenol-containing compound such as for example a phenol formaldehyde resin such as Novolac resins, carbonic acid, a salt of carbonic acid, carbonate, or combinations thereof. Optionally, in the present invention, the amidine and the second component form an amidine salt. According to the present invention, the amidine-containing compound may be present in the adhesive composition in an amount of at least 1% by weight based on total weight of the adhesive composition, such as at least 1.25% by weight, such as at least 1.5% by weight, and in some cases may be present in an amount of no more than 4% by weight based on total weight of the adhesive composition, such as no more than 3.75%, such as no more than 3.5% by weight. According to the present invention, the amidine-containing compound may be present in the adhesive composition in an amount of from 1% to 4% by weight based on total weight of the adhesive composition, such as from 1.25% to 3.75%, such as from 1.5% to 3.5%.

Optionally, the adhesive composition also may comprise rubber particles having a core-shell structure. Suitable core-shell rubber particles may be comprised of butadiene rubber or other synthetic rubbers, such as styrene-butadiene and acrylonitrile-butadiene and the like. The type of synthetic rubber and the rubber concentration is not limited as long as the particle size falls within the specified range as illustrated below.

According to the present invention, the average particle size of the rubber particles may be from 0.02 to 500 microns (20 nm to 500,000 nm), for example, the reported particle size for rubber particles provided by Kanekea Texas Corporation, as measured by standard techniques known in the industry, such as, for example, according to ISO 13320 and ISO 22412.

According to the present invention, the core-shell rubber particles may optionally be included in an epoxy carrier resin for introduction into the adhesive composition. Suitable finely dispersed core-shell rubber particles in an average particle size ranging from 50 nm to 250 nm may be master-batched in epoxy resin such as aromatic epoxides, phenolic novolac epoxy resin, bisphenol A and/or bisphenol F diepoxide, and/or aliphatic epoxides, which include cyclo-aliphatic epoxides, at concentrations ranging from 5% to 40% rubber particles by weight based on the total weight of the rubber dispersion, such as from 20% to 35%. Suitable epoxy resins may also include a mixture of epoxy resins. When utilized, the epoxy carrier resin may be an epoxy-containing component of the present invention such that the weight of the epoxy-containing component present in the structural adhesive composition includes the weight of the epoxy carrier resin.

Exemplary non-limiting commercial core-shell rubber particle products using poly(butadiene) rubber particles that may be utilized in the adhesive composition include a core-shell poly(butadiene) rubber dispersion (25% rubber by weight) in bisphenol F (commercially available as Kane Ace MX 136), a core-shell poly(butadiene) rubber dispersion (33% rubber by weight) in Epon® 828 (commercially available as Kane Ace MX 153), a core-shell poly(butadiene) rubber dispersion (37% rubber by weight) in bisphenol A (commercially available as Kane Ace MX 257), and a core-shell poly(butadiene) rubber dispersion (37% rubber by weight) in bisphenol F (commercially available as Kane Ace MX 267), each available from Kaneka Texas Corporation.

Exemplary non-limiting commercial core-shell rubber particle products using styrene-butadiene rubber particles that may be utilized in the adhesive composition include a core-shell styrene-butadiene rubber dispersion (33% rubber by weight) in low viscosity bisphenol A (commercially available as Kane Ace MX 113), a core-shell styrene-butadiene rubber dispersion (25% rubber by weight) in bisphenol A (commercially available as Kane Ace MX 125), a core-shell styrene-butadiene rubber dispersion (25% rubber by weight) in D.E.N.™-438 phenolic novolac epoxy (commercially available as Kane Ace MX 215), a core-shell styrene-butadiene rubber dispersion (25% rubber by weight) in Araldite® MY-721 multi-functional epoxy (commercially available as Kane Ace MX 416), a core-shell styrene-butadiene rubber dispersion (25% rubber by weight) in MY-0510 multi-functional epoxy (commercially available as Kane Ace MX 451), a core-shell styrene-butadiene rubber dispersion (25% rubber by weight) in Syna Epoxy 21 Cyclo-aliphatic Epoxy from Synasia (commercially available as Kane Ace MX 551), and a core-shell styrene-butadiene rubber dispersion (25% rubber by weight) in polypropylene glycol (MW 400) (commercially available as Kane Ace MX 715), each available from Kaneka Texas Corporation.

According to the present invention, if rubber particles having a core-shell structure are included in the adhesive composition, the rubber particles may be present in the adhesive composition in an amount of at least 10% by weight based on total composition weight, such as at least 20% by weight, such as at least 25% by weight, and in some cases may be present in the adhesive composition in an amount of no more than 45% by weight based on total composition weight, such as no more than 40% by weight, such as no more than 35% by weight. According to the present invention, rubber particles having a core-shell structure may be present in the adhesive composition, if at all, in an amount of from 10% to 45% by weight based on the total composition weight, such as from 20% to 40% by weight, such as from 25% to 35% by weight.

According to the present invention, the adhesive composition optionally may further comprise a secondary latent curing catalyst to promote the reaction of the epoxy compound and the polymeric compound. Useful secondary latent curing catalysts may be imidazoles such as 2,4-diamino-6-[2'-methylimidazolyl-(1')]-ethyl-s-triazine (commercially available as Curezol® 2MZ Azine, Air Products and Chemicals, Inc., Allentown, PA) or 2,4-diamino-6-[T-methylimidazolyl-(1')]-ethyl-s-triazineisocyanuric acid adduct dihydrate (commercially available as Curezol® 2MA-OK, Air Products and Chemicals, Inc., Allentown, PA), dicyandiamide (also known as Dyhard®, available from AlzChem AG, Trostberg, Germany), 3,4-dichlorophenyl-N,N-dimethylurea (also known as Diuron, available from AlzChem AG, Trostberg, Germany), or combinations thereof.

According to the present invention, when utilized, the secondary latent curing catalyst may be present in the structural adhesive in an amount of at least 1% by weight based on total composition weight, such as at least 2% such as at least 3%, and in some cases may be present in the adhesive composition in an amount of no more than 5% by weight based on total composition weight, such as no more than 4.5%, such as no more than 3.5%. According to the present invention, the secondary latent curing catalyst, if present, may present in an amount of from 1% to 5% by weight based on total composition weight, such as from 2% to 4.5%, such as from 3% to 3.5%.

Optionally, the adhesive formulation may also include epoxy compounds or resins that are not incorporated into or reacted as a part of any of the components described above, including epoxy-functional polymers that can be saturated or unsaturated, cyclic or acyclic, aliphatic, alicyclic, aromatic or heterocyclic. The epoxy-functional polymers can have pendant or terminal hydroxyl groups, if desired. They can contain substituents such as halogen, hydroxyl, and ether groups. A useful class of these materials includes polyepoxides comprising epoxy polyethers obtained by reacting an epihalohydrin (such as epichlorohydrin or epibromohydrin) with a di- or polyhydric alcohol in the presence of an alkali. Suitable polyhydric alcohols include polyphenols such as resorcinol; catechol; hydroquinone; bis(4-hydroxyphenyl)-2,2-propane, i.e., Bisphenol A; bis(4-hydroxyphenyl)-1,1-isobutane; 4,4-dihydroxybenzophenone; bis(4-hydroxyphenol)-1,1-ethane; bis(2-hydroxyphenyl)-methane and 1,5-hydroxynaphthalene.

Frequently used polyepoxides include polyglycidyl ethers of Bisphenol A, such as Epon® 828 epoxy resin which is commercially available from Hexion Specialty Chemicals, Inc. and having a number average molecular weight of about 400 and an epoxy equivalent weight of about 185-192. Other useful polyepoxides include polyglycidyl ethers of other polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, epoxy novolac resins, and polyepoxides that are partially defunctionalized by carboxylic acids, alcohol, water, phenols, mercaptans or other active hydrogen-containing compounds to give hydroxyl-containing polymers.

According to the present invention, reinforcement fillers may be added to the adhesive composition. Useful reinforcement fillers that may be introduced to the adhesive composition to provide improved mechanical properties include fibrous materials such as fiberglass, fibrous titanium dioxide, whisker type calcium carbonate (aragonite), and carbon fiber (which includes graphite and carbon nanotubes). In addition, fiber glass ground to 5 microns or wider and to 50 microns or longer may also provide additional tensile strength. Such reinforcement fillers, if utilized, may be present in the adhesive composition in an amount of at least 0.1% by weight based on total composition weight, such as at least 0.5% by weight, such as at least 1% by weight and, in some cases, may be present in an amount of no more than 5% by weight based on total composition weight, such as no more than 4.5% by weight, such as no more than 4% by weight. According to the present invention, reinforcement fillers may be present in the adhesive composition in an amount of from 0.1% by weight to 5% by weight based on total composition weight, such as from 0.5% by weight to 4.5% by weight, such as from 1% by weight to 4% by weight.

Optionally, according to the present invention, additional fillers, thixotropes, colorants, tints and/or other materials also may be added to the adhesive composition.

Useful thixotropes that may be used include untreated fumed silica and treated fumed silica, Castor wax, clay, and organo clay. In addition, fibers such as synthetic fibers like aromatic polyamide fibers (such as those commercially available as Aramid® fiber and Kevlar® fiber), acrylic fibers, and engineered cellulose fiber may also be utilized.

Useful colorants or tints may include red iron pigment, titanium dioxide, calcium carbonate, phthalocyanine green and phthalocyanine blue.

Useful fillers that may be used in conjunction with thixotropes may include inorganic fillers such as inorganic clay or silica.

Exemplary other materials that may be utilized include, for example, calcium oxide and carbon black.

The adhesive composition of the present invention may consist essentially of, or in some cases may consist of, an epoxy compound and a polymeric compound comprising at least two aminimide functional groups, wherein the polymeric compound reacts with the epoxy compound upon activation by an external energy source; wherein the polymeric compound is present in an amount from 2-8% by weight based on total weight of the adhesive composition.

The adhesive composition of the present invention may consist essentially of, or in some cases may consist of, an epoxy compound and a monomeric compound comprising at least one aminimide functional group, wherein the monomeric compound reacts with the epoxy compound upon activation by an external energy source; wherein the monomeric compound is present in an amount from 2-8% by weight based on total weight of the adhesive composition.

The adhesive composition of the present invention may comprise, or in some cases may consist essentially of, or in some cases may consist of, an adhesive composition comprising an epoxy compound, an aminimide-containing compound present in an amount of from 2% to 8% by weight based on total weight of the adhesive composition, and a reaction product of reactants comprising an amidine and a second component, wherein the epoxy, the aminimide-containing compound, and the reaction product react upon activation by an external energy source.

The present invention may also be a method for preparing an adhesive composition comprising, or in some cases consisting of, or in some cases consisting essentially of, mixing an epoxy and a compound comprising at least one aminimide functional group. According to the present invention, the epoxy compound may be any of the monoepoxides or polyepoxides described above. According to the present invention, the compound comprising the at least one aminimide functional group may be monomeric or polymeric, as described above, and may have at least one aminimide functional groups, as described above.

As stated above, the present disclosure is directed to one-component structural adhesive compositions that are used to bond together two substrate materials for a wide variety of potential applications in which the bond between the substrate materials provides particular mechanical properties related to elongation, tensile strength, lap shear strength, T-peel strength, modulus, or impact peel strength. The structural adhesive may be applied to either one or both of the substrate materials being bonded such as, by way of non-limiting example, components of an automobile frame. The pieces are aligned, and pressure and spacers may be added to control bond thickness. The adhesive may be cured using an external source such as an oven (or other thermal means) or through the use of actinic radiation (UV light, etc.). Suitable substrate materials that may be bonded by the structural adhesive compositions of the present invention include, but are not limited to, materials such as metals or metal alloys, natural materials such as wood, polymeric materials such as hard plastics, or composite materials wherein each of the first and the second substrate material may be independently selected from these materials. The structural adhesives of the present invention are particularly suitable for use in various automotive or industrial applications.

The present invention may also be a method for forming a bonded substrate comprising, or in some cases consisting of, or in some cases consisting essentially of, applying the adhesive composition described above to a first substrate; contacting a second substrate to the adhesive composition such that the adhesive composition is located between the first substrate and the second substrate; and curing the adhesive composition.

The adhesive composition described above may be applied alone or as part of an adhesive system that can be deposited in a number of different ways onto a number of different substrates. The adhesive system may comprise a number of the same or different adhesive layers. An adhesive layer is typically formed when an adhesive composition that is deposited onto the substrate is at least partially cured by methods known to those of ordinary skill in the art (e.g., by exposure to thermal heating).

The adhesive composition can be applied to the surface of a substrate in any number of different ways, non-limiting examples of which include brushes, rollers, films, pellets, spray guns and applicator guns.

After application to the substrate, the adhesive composition can be at least partially cured, such as by baking and/or curing at elevated temperature for any desired time period sufficient to at least partially cure the adhesive composition on the substrate (e.g., from 5 minutes to 1 hour), such as at a temperature of at least 100° C., such as at least 110° C., such as at least 120° C., such as at least 130° C., and in some cases may be exposed to a temperature of no more than 200° C., such as no more than 190° C., such as no more than 180° C., such as no more than 170° C. According to the present invention, the adhesive composition can be at least partially cured, such as by baking and/or curing at elevated temperature for any desired time period sufficient to at least partially cure the adhesive composition on the substrate (e.g., from 5 minutes to 1 hour), such as at a temperature of from 100° C. to 200° C., such as from 110° C. to 190° C., such as from 120° C. to 180° C., such as from 130° C. to 170° C.

It was surprisingly discovered that the adhesive composition of the present invention resulted in improved stability of the composition, as demonstrated by improved complex viscosity, as well as improved mechanical properties of the cured adhesive, such as improved lap shear.

The adhesive composition of the present invention (as measured with an Anton Paar Physica MCR 301 rheometer with 25 mm parallel plate and 1 mm gap) may have a change in complex viscosity ($\eta*A1$, measured at the condition of $\gamma=0.05\%$ (at 21 seconds) after 3 days at 43° C. (conditioned at 35° C. before each measurement)) of no more than 5×the initial value, such as no more than 4× the initial value, such as no more than 3× the initial value, such as no more than 2× the initial value.

According to the present invention, after the adhesive composition is applied to a substrate and at least partially cured, the bonded substrate(s) may demonstrate a lap shear of at least 7 as measured according to ISO 4587 test method, such as at least 12, such as at least 14, such as at least 16, such as at least 22.

Whereas particular embodiments have been described above for purposes of illustration, it will be evident to those skilled in the art that numerous variations of the details of the coating composition, coating, and methods disclosed herein may be made without departing from the scope in the appended claims.

Illustrating the invention are the following examples that are not to be considered as limiting the invention to their details. All parts and percentages in the examples, as well as throughout the specification, are by weight unless otherwise indicated.

EXAMPLES

The following Examples A-J provide descriptions of the synthesis of aminimide-containing materials and 1,8-diazabicyclo[5.4.0]undec-7-ene (DBU) salts which were used to prepare the adhesive compositions of Examples 2-12, as described in further detail herein. In each Example, the final powder was ground with a mortar and pestle, and was shaken on a sieve shaker (Retsch AS 300) at an amplitude of 1 mm/g and a sieve of <125 μm.

Synthesis Examples A-J

Example A

Compound A was synthesized as follows: Into a 500-milliliter, 4-necked flask equipped with a stirrer, a condenser, a nitrogen inlet, and a thermocouple in a heating mantle, was charged 68.0 grams of methyl benzoate, 50.06 grams of 1,1-dimethylhydrazine (62% by weight solution available from Lonza Group Ltd.), 31.6 grams of propylene oxide, and 310 grams of isopropanol. Agitation and a nitrogen flow of 0.2 scft/min ("scft" means standard cubic feet) were started. The mixture was stirred at 20° C. for 2 hours and then at 55° C. for 24 hours. The reaction progress was monitored by a Gas Chromatographer. After completion of the reaction, the reaction mixture was concentrated by evaporation of solvent, and the residual white solid was recrystallized from ethyl acetate. A white powder was obtained in a yield of 56% by weight. The solid was further ground into fine powder having a sieve fraction of <125 μm, as described above.

Example B

Into a 500-milliliter, 4-necked flask equipped with a stirrer, a condenser, a nitrogen inlet, and a thermocouple in a heating mantle, was charged 54.4 grams of methyl benzoate, 40.6 grams of 1-aminopiperidine, 23.21 grams of propylene oxide, and 250 grams of isopropanol. Agitation and a nitrogen flow of 0.2 scft/min ("scft" means standard cubic feet) were started. The mixture was stirred at 20° C. for 2 hours and then at 55° C. for 24 hours. The reaction progress was monitored by a Gas Chromatographer. After completion of the reaction, the reaction mixture was concentrated by evaporation of solvent, and the residual white solid was recrystallized from ethyl acetate. A white powder was obtained in a yield of 59% by weight. The solid was further ground into fine powder having a sieve fraction of <125 μm, as described above.

Example C

Into a 500-milliliter, 4-necked flask equipped with a stirrer, a condenser, a nitrogen inlet, and a thermocouple in a heating mantle, was charged 54.4 grams of dimethyl terephthalate, 54.31 grams of 1,1-dimethylhydrazine (62% solution), 65.09 grams of propylene oxide, and 203 grams of isopropanol. Agitation and a nitrogen flow of 0.2 scft/min ("scft" means standard cubic feet) were started. The mixture was stirred at 20° C. for 2 hours and then at 80° C. for 8 hours. The reaction progress was monitored by a Gas Chromatographer. After completion of the reaction, the reaction mixture was concentrated by evaporation of solvent, and the residual white solid was recrystallized from ethyl acetate. A white powder was obtained in a yield of 48% by weight. The solid was further ground into fine powder having a sieve fraction of <125 μm, as described above.

Example D

Into a 500-milliliter, 4-necked kettle equipped with a stirrer, a condenser, a nitrogen inlet, and a thermocouple in a heating mantle, was charged 30.0 grams of methyl benzoate, 22.07 grams of 1,1-dimethylhydrazine (62% solution), 137.4 grams of Epon 1001 (75% in xylene available from Momentive Performance Materials Inc.), and 130 grams of Dowanol PM. Agitation and a nitrogen flow of 0.2 scft/min ("scft" means standard cubic feet) were started. The mixture was stirred at 20° C. for 1 hour, and at 55° C. for 4 hours, and then 80° C. for 16 hours. The reaction progress was monitored by a Gas Chromatographer. After completion of the reaction, the reaction mixture was concentrated by evaporation of solvent under vacuum. The residual liquid was poured out onto aluminum foil and formed a solid at room temperature. The solid was ground into fine powder having a sieve fraction of <125 μm, as described above.

Example E

Into a 500-milliliter, 4-necked kettle equipped with a stirrer, a condenser, a nitrogen inlet, and a thermocouple in a heating mantle, was charged 25.81 grams of 1,1-dimethylhydrazine (62% solution), 238.5 grams of Epon 1001 (75% in xylene), and 100 grams of isopropanol and 20 grams of Dowanol PM. Agitation and a nitrogen flow of 0.2 scft/min ("scft" means standard cubic feet) were started. The mixture was stirred at 20° C. for 1 hour, and at 55° C. for 5 hours. The reaction progress was monitored by amine MEQ (as determined by ASTM D4370, using 716 DMS Titrino from Brinkmann). When amine MEQ stalled, 41.0 grams of hexahydrophthalic anhydride (HHPA) were added into reaction mixture. The reaction mixture was heated to 80° C. until anhydride peaks (1857 cm$^{-1}$ and 1782 cm$^{-1}$) disappeared in the IR spectrum of the reaction mixture. After completion of the reaction, the reaction mixture was concentrated by evaporation of solvent under vacuum. The residual liquid was poured out onto aluminum foil and formed a solid at room temperature. The solid was ground into fine powder having a sieve fraction of <125 μm, as described above.

Example F

Into a 500-milliliter, 4-necked kettle equipped with a stirrer, a condenser, a nitrogen inlet, and a thermocouple in a heating mantle, was charged 25.81 grams of 1,1-dimethylhydrazine (62% solution), 238.5 grams of Epon 1001 (75% in xylene), and 103 grams of Dowanol PM. Agitation and a nitrogen flow of 0.2 scft/min ("scft" means standard cubic feet) were started. The mixture was stirred at 20° C. for 1 hour, and at 80° C. for 8 hours. The reaction progress was monitored by amine MEQ. When amine MEQ stalled, 30.3 grams of e-caprolactone were added into reaction mixture at 50° C. After addition, the reaction mixture was heated to 80° C. until e-caprolactone peaks (850 cm$^{-1}$ and 860 cm$^{-1}$) disappeared in the IR spectrum of the reaction mixture. After completion of the reaction, the reaction mixture was concentrated by evaporation of solvent under vacuum. The residual liquid was poured out onto aluminum foil and formed a solid at room temperature. The solid was ground into fine powder having a sieve fraction of <125 μm, as described above.

Example G

Into a 500-milliliter, 4-necked kettle equipped with a stirrer, a condenser, a nitrogen inlet, and a thermocouple in a heating mantle, was charged 51.20 grams of methyl trimethyl acetate, 44.30 grams of 1,1-dimethylhydrazine (62% solution), 275.60 grams of Epon 1001 (75% in xylene), and 160 grams of Dowanol PM. Agitation and a nitrogen flow of 0.2 scft/min ("scft" means standard cubic feet) were started. The mixture was stirred at 20° C. for 1 hour, and at 55° C. for 2 hours, and then 80° C. for 12 hours. The reaction progress was monitored by a Gas Chromatographer. After completion of the reaction, the reaction mixture was concentrated by evaporation of solvent under vacuum. The residual liquid was poured out onto aluminum foil and formed a solid at room temperature. The solid was ground into fine powder having a sieve fraction of <125 μm, as described above.

Example H

Into a 500-milliliter, 4-necked kettle equipped with a stirrer, a condenser, a nitrogen inlet, and a thermocouple in a heating mantle, was charged 32.31 grams of 1,1-dimethylhydrazine (62% solution), 19.36 grams of propylene oxide, and 61.40 grams of Dowanol PM. Agitation and a nitrogen flow of 0.2 scft/min ("scft" means standard cubic feet) were started. The mixture was stirred at 20° C. for 1 hour, and at 50° C. for 5 hours. The reaction progress was monitored by amine MEQ. When amine MEQ stalled, 147.5 grams of maleic anhydride octadecene copolymer (solid 71%) were added into reaction mixture at 50° C. After addition, the reaction mixture was heat to 80° C. until anhydride peaks (1857 cm$^{-1}$ and 1782 cm$^{-1}$) disappeared by IR. After completion of the reaction, and the reaction mixture was concentrated by evaporation of solvent under vacuum. The residual liquid was poured out onto aluminum foil and formed a solid at room temperature. The solid was ground into fine powder having a sieve fraction of <125 μm, as described above.

Example I

Into a 500-milliliter, 4-necked kettle equipped with a stirrer, a condenser, a nitrogen inlet, and a thermocouple in a heating mantle, was charged 165.0 grams of FRJ-425 (a phenol formaldehyde novolac resin commercially available from SI Group) and heated to 160° C. to become a liquid. 117.6 grams of DBU (Industrial grade from BASF) were added into reaction mixture drop wise. After addition, the reaction mixture was heated to 180° C. and held for 30 minutes. After holding, the liquid was poured out onto aluminum foil and formed a solid at room temperature. The solid was ground into fine powder having a sieve fraction of <125 μm, as described above.

Example J

Into a 2000-milliliter, 4-necked kettle equipped with a stirrer, a condenser, a nitrogen inlet, and a thermocouple, was charged 50.6 grams of DBU (Industrial grade from BASF), 6.66 grams of DI water, and 300 grams of ethyl acetate. 50 grams of dry ice were partially added into reaction mixture and white precipitate formed. After addition, the reaction mixture was held at room temperature for 1 hour. After holding, the white solid was collected by filtration. The solid was washed with ethyl acetate twice (2×30 mL) and dried in vacuum oven. A white powder was obtained in a yield of 97% by weight. The solid was ground into fine powder having a sieve fraction of <125 μm, as described above.

The following examples show the preparation of various adhesive compositions prepared with aminimides of the invention as catalysts for epoxy resins. Components were added in the order shown in Table 1.

Adhesive Examples 1-12

Twelve (12) adhesive compositions were prepared from the mixture of ingredients shown in Table 1.

TABLE 1

Adhesive compositions

| Components | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| Kane Ace MX-153[1] | 48 | 48 | 48 | 48 | 48 | 48 | 48 | 48 | 48 | 48 | 48 | 48 |
| Epoxy resin[2] | 18.4 | 18.4 | 18.4 | 18.4 | 18.4 | 18.4 | 18.4 | 18.4 | 18.4 | 18.4 | 18.4 | 18.4 |
| TINT-AYD ST 8703[3] | 0.1 | 0.1 | 0.1 | 0.1 | 0.1 | 0.1 | 0.1 | 0.1 | 0.1 | 0.1 | 0.1 | 0.1 |
| Dyhard SF100[4] | 3.4 | 3.4 | 3.4 | 3.4 | 3.4 | 3.4 | 3.4 | 3.4 | 3.4 | 3.4 | 3.4 | 3.4 |
| Diuron[5] | 0.3 | 0.3 | 0.3 | 0.3 | 0.3 | 0.3 | 0.3 | 0.3 | 0.3 | 0.3 | 0.3 | 0.3 |
| Synthesis Example A | — | 2 | — | — | — | — | — | — | — | 2 | 2 | — |
| Synthesis Example B | — | — | 2 | — | — | — | — | — | — | — | — | — |
| Synthesis Example C | — | — | — | 2 | — | — | — | — | — | — | — | — |
| Synthesis Example D | — | — | — | — | 4 | — | — | — | — | — | — | — |
| Synthesis Example E | — | — | — | — | — | 4 | — | — | — | — | — | — |
| Synthesis Example F | — | — | — | — | — | — | 4 | — | — | — | — | — |
| Synthesis Example G | — | — | — | — | — | — | — | 4 | — | — | — | — |
| Synthesis Example H | — | — | — | — | — | — | — | — | 4 | — | — | 4 |
| Synthesis Example I | 1 | 2 | 2 | 2 | 2 | 2 | 2 | 2 | 2 | — | — | — |
| Synthesis Example J | — | — | — | — | — | — | — | — | — | 2 | — | — |
| Mica[6] | 1 | 1 | 1 | 1 | 1 | 1 | 1 | 1 | 1 | 1 | 1 | 1 |
| Calcium Oxide[7] | 2 | 2 | 2 | 2 | 2 | 2 | 2 | 2 | 2 | 2 | 2 | 2 |
| TOTAL | 73.2 | 77.2 | 77.2 | 77.2 | 79.2 | 79.2 | 79.2 | 79.2 | 79.2 | 77.2 | 75.2 | 77.2 |

[1]Blend of bisphenol A based epoxy resin and core-shell rubber available from Kaneka Corporation

[2]Epoxy capped polyester

[3]Phthalo green dye available from Elementis Specialties

[4]Cyanoguanidine available from Alz Chem

[5]Dimethyl-1,1,3-(3,4-dichlorophenyl) available from Alz Chem

[6]Potassium alumina silica available from Pacer Corporation

[7]Available from Mississippi Lime Company

Adhesive lap shear specimens were prepared by applying adhesive on 20 mm×90 mm×0.8 mm size of hot dip galvanized (HDG) steel panels. The adhesive was applied to one end of a panel covering the whole width and 10 mm from the end. Glass beads with an average diameter of 0.25 mm were lightly sprinkled onto the adhesive to help maintain thickness. Another panel without adhesive was then placed over the adhesive area in an end-to-end fashion that would result in a 10 mm×20 mm bond area. The joints were secured with metal clips with excess adhesive cleaned. They were then placed in an oven and baked according to specifications. The baked adhesive specimens were tested in an Instron 5567 machine in tensile mode with a pull rate of 10 mm per minute.

The adhesive lap shear strengths for the above compositions are shown in Table 2.

TABLE 2

| | Lap Shear |||||||||||| 
|---|---|---|---|---|---|---|---|---|---|---|---|---|
| | Lap shear Tensile (MPa) |||||||||||| 
| Bake condition | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
| 130° C./ 17 minutes | 3.4 | 18.2 | 18.4 | 17.6 | 18.2 | 19.2 | 18.1 | 17.4 | 13.2 | 19.7 | 7.3 | 14.4 |

Adhesive viscosity was measured with an Anton Paar Physica MCR 301 rheometer with 25 mm parallel plate and 1 mm gap. Shear condition for the measurement was as follows: Conditioning: Rotation with shear rate at $0.1\ s^{-1}$ for 60 seconds; Tempering: No shear for 240 seconds; Amplitude test: Oscillation with log increasing strain γ from 0.01 to 10% in 90 seconds (data measured every 3 seconds); Shear phase: Oscillation with 10% strain (γ) at 10 Hz for 120 seconds (data measured every 10 seconds); Re-conditioning: Rotation with shear rate at $0.1\ s^{-1}$ for 60 seconds; Regenerated mode: Oscillation with 0.05% strain (γ) for 120 seconds (data measured every 10 seconds).

Complex viscosity η*A1, measured at the condition of γ=0.05% (at 21 seconds), of the above adhesives was measured for its initial value, after 3 days at 43° C. Samples were conditioned to 35° C. before each measurement. Results of those measurements are shown in Table 3.

TABLE 3

| | Viscosity |||||||||||| 
|---|---|---|---|---|---|---|---|---|---|---|---|---|
| | Complex viscosity 1* A1 |||||||||||| 
| Aging Condition | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
| Initial | 583 | 634 | 634 | 774 | 689 | 665 | 1190 | 710 | 772 | 846 | 584 | 716 |
| 3 days at 43° C. | 594 | 829 | 799 | 1270 | 3770 | 810 | 1120 | 3480 | 2170 | 2290 | 732 | 1770 |

Aspects of the Invention

In the following, some aspects of the invention are summarized:
1. An adhesive composition comprising:
    an epoxy compound; and
    a compound comprising at least one aminimide functional group, wherein the compound comprising at least one aminimide functional group reacts with the epoxy compound upon activation by an external energy source; wherein the compound comprising at least one aminimide functional group is present in an amount from 2-8% by weight based on total weight of the adhesive composition.
2. The adhesive composition of aspect 1 comprising:
    an epoxy compound; and
    a polymeric compound comprising at least two aminimide functional groups, wherein the polymeric compound reacts with the epoxy compound upon activation by an external energy source; wherein the polymeric compound is present in an amount from 2-8% by weight based on total weight of the adhesive composition.
3. The adhesive composition of aspect 2, wherein the polymeric compound comprises a reaction product of reactants comprising a polyepoxide, a hydrazine comprising a trivalent nitrogen, and a reactant comprising a carbonyl group.
4. The adhesive composition of aspect 2 or 3, wherein the polymeric compound further comprises at least one additional functional group.
5. The adhesive composition of aspect 1 comprising:
    an epoxy compound; and
    a monomeric compound comprising at least one aminimide functional group, wherein the monomeric compound reacts with the epoxy compound upon activation by an external energy source; wherein the monomeric compound is present in an amount from 2-8% by weight based on total weight of the adhesive composition.
6. The adhesive composition of aspect 5, wherein the monomeric compound comprises a reaction product of reactants comprising a monoepoxide, a hydrazine comprising a trivalent nitrogen, and a reactant comprising a carbonyl group.
7. The adhesive composition of any of the preceding aspects, wherein the epoxy compound is present in an amount of from 50% to 90% by weight based on total composition weight.
8. The adhesive composition of any of the preceding aspects, wherein the epoxy contains an epoxy-capped polyester.
9. The adhesive composition of any of the preceding aspects, further comprising an amidine salt.
10. The adhesive composition of any of the preceding aspects, wherein the external energy source comprises a temperature of at least 100° C.
11. The adhesive composition of aspect 1 comprising:
    an epoxy compound;
    an aminimide-containing compound present in an amount of from 2% to 8% by weight based on total weight of the adhesive composition; and
    a reaction product of reactants comprising an amidine and a second component,
    wherein the epoxy, the aminimide-containing compound, and the reaction product react upon activation by an external energy source.
12. The adhesive composition of aspect 11, wherein the aminimide is a reaction product of a polyepoxide and/or a monoepoxide, a hydrazine comprising a trivalent nitrogen, and a reactant comprising a carbonyl group.
13. The adhesive composition of aspect 11 or 12, wherein the second component comprises a phenol.
14. The adhesive composition of any of aspects 11-13, wherein the second component comprises carbonic acid, a salt of carbonic acid, carbonate, or combinations thereof.
15. The adhesive composition of any of the preceding aspects, further comprising rubber particles having a core/shell structure.
16. The adhesive composition of any of the preceding aspects, further comprising a secondary latent catalyst.
17. A method for forming a bonded substrate comprising:
    applying the adhesive composition of any of the preceding aspects to a first substrate;
    contacting a second substrate to the adhesive composition such that the adhesive composition is located between the first substrate and the second substrate; and
    curing the adhesive composition.
18. An adhesive comprising the composition of any of the preceding aspects in a cured state.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

We claim:
1. An adhesive composition comprising:
    an epoxy compound;
    a compound in an amount of two to eight percent by weight based on total weight of the adhesive composition and comprising an aminimide functional group;
    a reaction product of reactants comprising an amidine and a carbonic acid, a salt of a carbonic acid, a carbonate, or combinations thereof; and
    a secondary latent curing catalyst comprising an amine, an imidazole, and/or a urea;
    wherein the compound reacts with the epoxy compound upon activation by an external energy source.
2. The adhesive composition of claim 1, wherein the compound comprises a monomeric compound or a polymeric compound.
3. The adhesive composition of claim 2, wherein the monomeric compound comprises a reaction product of reactants comprising a monoepoxide, a hydrazine comprising a trivalent nitrogen, and a reactant comprising a carbonyl group.
4. The adhesive composition of claim 2, wherein the polymeric compound comprises a reaction product of reactants comprising an epoxy compound, a hydrazine, and an anhydride functional material.
5. The adhesive composition of claim 1, wherein the amine comprises a guanidine.
6. The adhesive composition of claim 1, wherein the composition comprises the epoxy compound in an amount of 50% to 90% by weight based on total weight of the composition.

7. The adhesive composition of claim 1, wherein the epoxy compound comprises an epoxy-capped polyester.

8. The adhesive composition of claim 1, wherein the compound further comprises an additional functional group.

9. The adhesive composition of claim 1, further comprising an amidine salt.

10. The adhesive composition of claim 1, wherein the reactants further comprise a phenol.

11. The adhesive composition of claim 1, further comprising rubber particles having a core/shell structure.

12. The adhesive composition of claim 1, wherein the external energy source comprises a temperature of at least 100° C.

13. A method for forming a bonded substrate comprising:
applying the adhesive composition of claim 1 to a first substrate;
contacting a second substrate to the adhesive composition such that the adhesive composition is located between the first substrate and the second substrate; and
curing the adhesive composition.

14. An adhesive comprising the adhesive composition of claim 1 in a cured state.

15. A substrate comprising the adhesive composition of claim 1 in a cured state.

16. The substrate of claim 15, wherein the substrate comprises an automotive frame.

17. An adhesive composition comprising:
an epoxy compound in an amount of 50 percent by weight to 90 percent by weight based on total weight of the composition;
a compound in an amount of two percent by weight to eight percent by weight based on total weight of the adhesive composition and comprising an aminimide functional group, the compound comprising a polymeric compound comprising a reaction product of reactants comprising an epoxy compound, a hydrazine, and an anhydride functional material;
a reaction product of reactants comprising an amidine and a phenol and present in an amount of 1 percent by weight to 4 percent by weight based on total weight of the composition; and
a secondary latent curing catalyst in an amount of 1 percent by weight to 5 percent by weight based on total weight of the composition and comprising an amine, an imidazole, and/or a urea;
wherein the compound reacts with the epoxy compound upon activation by an external energy source.

18. The adhesive composition of claim 17, wherein the amine comprises a guanidine.

19. The adhesive composition of claim 17, wherein the epoxy compound comprises an epoxy-capped polyester.

* * * * *